April 14, 1931. J. SIM 1,801,178
DEAERATING OF FEED WATER FOR BOILERS
Filed Oct. 6, 1928
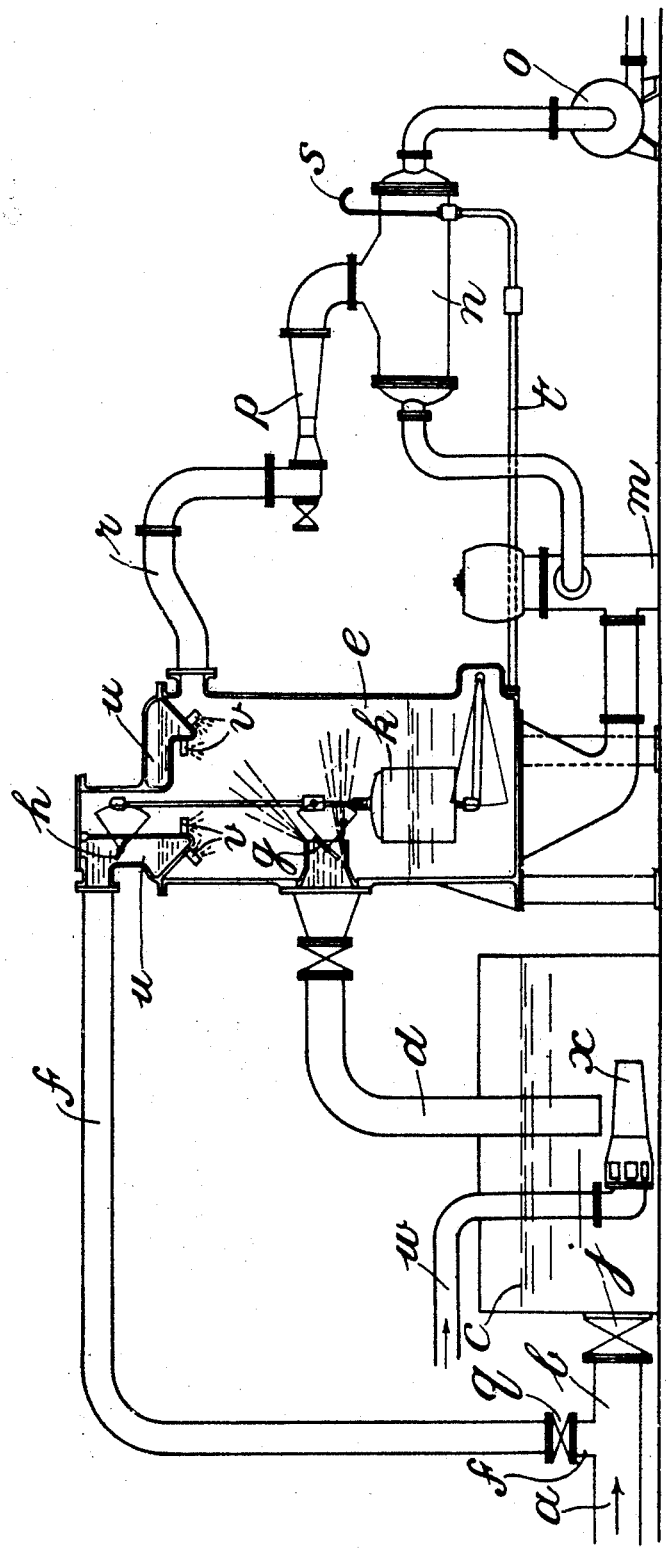
James Sim
INVENTOR
BY William C. Linton
ATTORNEY Patented Apr. 14, 1931

1,801,178

UNITED STATES PATENT OFFICE

JAMES SIM, OF CATHCART, GLASGOW, SCOTLAND, ASSIGNOR TO G. & J. WEIR, LIMITED, OF CATHCART, GLASGOW, SCOTLAND

DEAERATING OF FEED WATER FOR BOILERS

Application filed October 6, 1928, Serial No. 310,883, and in Great Britain November 12, 1927.

The present invention consists in a method of and apparatus for de-aerating feed water for boilers. The object of the invention is to provide for efficient de-aeration at moderate cost.

The method according to the invention is as follows:—

1. A de-aerating chamber is provided. The water to be treated is admitted to this chamber and, after de-aeration, is withdrawn from it. The separated air is withdrawn from the chamber, and the chamber maintained at a suitable pressure (vacuum).

2. The water to be treated is divided into two portions.

3. The one portion—the major portion—is heated before admission to the de-aerating chamber. The other portion is left unheated.

4. The admission of both portions to the de-aerating chamber is controlled in accordance with the water level in that chamber.

5. The unheated portion is sprayed into the de-aerating chamber.

6. The heated portion is admitted to the de-aerating chamber at a temperature higher than that corresponding to the pressure (vacuum) within that chamber, so that a portion of it will flash into vapour on admission.

7. The admission of the two portions is so arranged that the vapour obtained from the flashing of the heated portion is subjected to the spray from the unheated portion.

The carrying of the invention into effect in one convenient manner will be described; and the invention will be defined in the annexed claims.

The accompanying diagrammatic drawing illustrates the carrying of the invention into effect in one convenient manner.

$a$ is a pipe through which is supplied the water to be de-aerated. The major portion of this water is admitted through the pipe $b$ to the tank or heater $c$ in which it is heated by any suitable means, e. g. by direct contact with exhaust steam. From this tank or heater the heated water passes by the pipe $d$ to the de-aerating chamber $e$. Its admission to this chamber is controlled by the valve $g$. The unheated portion of the water passes to the de-aerating chamber by the pipe $f$. Its admission to this chamber is controlled by the valve $h$. Both valves are controlled by a float $k$ according to the water level in the de-aerating chamber. Each valve might be controlled by an independent float; but the employment of a single float is convenient and effective.

It is generally desirable that the heated portion of the water be several times as great as the unheated portion. In the present example the heated portion constitutes 80% of the whole. The valves $g$ and $h$ are so arranged that the ratio of quantity between the two portions, that is, four to one in the present example, is maintained approximately constant at any position of the valves between full closed position and full open position.

The water is withdrawn from the de-aerating chamber by the pump $m$ and passed through the ejector condenser $n$ which is of the surface type. The water is then delivered to the boiler-feed pump $o$. The air is withdrawn from the de-aerating chamber through the pipe $r$ by a steam-jet air-ejector $p$. The steam of the jet and the vapour withdrawn with the air are condensed in the ejector condenser $n$. The air is discharged through the pipe $s$, while the water drains back by the pipe $t$ into the de-aerating chamber. The air-withdrawing means are arranged to maintain a suitable pressure (vacuum) within the de-aerating chamber.

The heated portion of the feed-water is arranged to enter the de-aerating chamber at a temperature appreciably higher—say 20° to 30° Fahr. higher—than that corresponding to the pressure (vacuum) within the chamber so that on admission it tends to flash into steam, and a portion of it does do this. The unheated portion of the feed water is admitted to a chamber $u$ provided at the top of the de-aerating chamber. Nozzles or spraying devices $v$ are arranged at the bottom of this chamber so that this portion of the feed water enters the de-aerating chamber in the form of spray. The arrangement for the entry of the heated portion of the feed water to the de-aerating chamber is such that the steam produced by the flashing of the water on entering the de-aerating chamber is subjected to this spray. An effective means of liberating the air and condensing the flashed steam is thus provided.

Having thus described my invention, what I claim as new and desire to secure by Letters Patent is:—

1. The method of de-aerating water consisting in maintaining a reduced pressure in a de-aerating chamber, separating the water to be treated into two portions, heating one portion of the water prior to its admission in the chamber, leaving the remaining portion of the water unheated, admitting in the chamber the unheated portion of the water in a spray, separately admitting the heated portion of the water in the chamber at a temperature higher than that corresponding to the reduced pressure in said chamber whereby a part of the heated portion of the water will flash on admission, subjecting the flashing from the heated portion of the water to the spray of the unheated portion of the water, and controlling the admission of both portions of the water by the water level in the chamber.

2. The method of de-aerating water consisting in maintaining a reduced pressure in a de-aerating chamber, separating the water to be treated into two unequal portions, heating the larger portion of the water prior to its admission in the chamber, leaving the smaller portion of the water unheated, admitting in the chamber the unheated portion of the water in a spray, separately admitting the heated portion of the water in the chamber at a temperature higher than that corresponding to the reduced pressure in said chamber whereby a part of the heated portion of the water will flash on admission, subjecting the flashing from the heated portion of the water to the spray of the unheated portion of the water, and controlling the admission of both portions of the water by the water level in the chamber.

3. The method of de-aerating water consisting in maintaining a reduced pressure in a de-aerating chamber, separating the water to be treated into two unequal portions, one of the portions of the water constituting 75 to 85 per cent of the whole, heating this latter portion of the water prior to its admission in the de-aerating chamber, leaving the remaining portion of the water unheated, admitting in the chamber the unheated portion of the water in a spray, separately admitting the heated portion of the water in the chamber at a temperature higher than that corresponding to the reduced pressure in said chamber whereby a part of the heated portion of the water will flash on admission, subjecting the flashing from the heated portion of the water to the spray of the unheated portion of the water, and controlling the admission of both portions of the water by the water level in the chamber.

4. The method of de-aerating water consisting in maintaining a reduced pressure in a de-aerating chamber, separating the water to be treated into two portions, heating one portion of the water prior to its admission in the chamber, leaving the remaining portion of the water unheated, admitting in the chamber the unheated portion of the water in a spray, separately admitting the heated portion of the water in the chamber at a temperature from 20 to 30 degrees Fahrenheit higher than that corresponding to the reduced pressure within the chamber whereby a part of the heated portion of the water will flash on admission, subjecting the flashing from the heated portion of the water to the spray of the unheated portion of the water, and controlling the admission of both portions of the water by the water level in the chamber.

5. The method of de-aerating water consisting in maintaining a reduced pressure in a de-aerating chamber, separating the water to be treated into two unequal portions, one of the portions of the water constituting 75 to 85 per cent of the whole, heating this latter portion of the water prior to its admission in the de-aerating chamber, leaving the remaining portion of the water unheated, admitting in the chamber the unheated portion of the water in a spray, separately admitting the heated portion of the water in the chamber at a temperature from 20 to 30 degrees Fahrenheit higher than that corresponding to the reduced pressure within the chamber whereby a part of the heated portion of the water will flash on admission, subjecting the flashing from the heated portion of the water to the spray of the unheated portion of the water, and controlling the admission of both portions of the water by the water level in the chamber.

6. The method of de-aerating water consisting in maintaining a reduced pressure in a de-aerating chamber, separating the water to be treated into two portions, heating one portion of the water prior to its admission in the de-aerating chamber, leaving the remaining portion of the water unheated, admitting in the chamber the unheated portion of the water in a spray, separately admitting the heated portion of the water in the chamber at a temperature higher than that corresponding to the reduced pressure in said chamber whereby a part of the heated portion of the water will flash on admission, subjecting the flashing from the heated portion of the water to the spray of the unheated portion of the water to liberate the air and vapors therefrom, withdrawing the liberated air and vapors from the chamber, condensing the vapors, and reutrning the condensate to the chamber for admixture with the water in the latter.

7. The method of de-aerating water consisting in separating the water to be treated into two portions, heating one portion of the water prior to its admission to the de-aerating chamber, leaving the remaining portion of the water unheated, admitting in the chamber the unheated portion of the water in a spray, separately admitting the heated portion of the water in the chamber and causing a part of said heated water to flash on admission in the chamber, subjecting the flashing from the heated portion of the water to the spray of the unheated portion of the water to liberate the air and vapors therefrom, withdrawing the liberated air and vapors from the chamber, condensing the vapors and returning the condensate to the chamber for admixture with the water in the latter.

I hereby sign my name to this specification.

JAMES SIM.